(12) United States Patent
Gomez et al.

(10) Patent No.: US 11,803,711 B2
(45) Date of Patent: *Oct. 31, 2023

(54) DEPTHWISE SEPARABLE CONVOLUTIONS FOR NEURAL MACHINE TRANSLATION

(71) Applicant: Google LLC, Mountain View, CA (US)

(72) Inventors: Aidan Nicholas Gomez, Toronto (CA); Lukasz Mieczyslaw Kaiser, Mountain View, CA (US); Francois Chollet, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,169

(22) Filed: Nov. 20, 2020

(65) Prior Publication Data
US 2021/0073481 A1 Mar. 11, 2021

Related U.S. Application Data

(63) Continuation of application No. 16/688,958, filed on Nov. 19, 2019, now Pat. No. 10,853,590, which is a
(Continued)

(51) Int. Cl.
G10L 25/30 (2013.01)
G06F 40/58 (2020.01)
(Continued)

(52) U.S. Cl.
CPC ............ *G06F 40/58* (2020.01); *G06F 40/263* (2020.01); *G06N 3/045* (2023.01); *G06N 3/08* (2013.01); *G10L 25/30* (2013.01)

(58) Field of Classification Search
CPC ..... G06N 3/0472; G06K 9/6256; G10L 25/30
See application file for complete search history.

(56) References Cited

U.S. PATENT DOCUMENTS 9,830,709 B2 11/2017 Li
2008/0082320 A1 4/2008 Popa et al.
(Continued)

FOREIGN PATENT DOCUMENTS

CN 105868829 A 8/2016
CN 106471526 A 3/2017
(Continued)

OTHER PUBLICATIONS

Shah, et al., "Deep Residual Networks with Exponential Linear Unit," Third International Symposium on Computer Vision and the Internet (VisionNet), 2016. (Year: 2016).*
(Continued)

Primary Examiner — Feng-Tzer Tzeng
(74) Attorney, Agent, or Firm — Fish & Richardson P.C.

(57) ABSTRACT

Methods, systems, and apparatus, including computer programs encoded on computer storage media for performing machine translation tasks. One method includes receiving an input text segment in an input language; processing the input text segment using an encoder neural network to generate an encoder neural network output, the encoder neural network comprising multiple depth wise separable convolutional neural network layers; processing the encoder neural network output using an autoregressive decoder neural network to generate a decoder neural network output; and processing the decoder neural network output to generate a predicted output text segment in a target natural language.

19 Claims, 6 Drawing Sheets

Related U.S. Application Data continuation of application No. PCT/US2018/033732, filed on May 21, 2018.

(60) Provisional application No. 62/509,038, filed on May 19, 2017.

(51) Int. Cl.
*G06F 40/263* (2020.01)
*G06N 3/08* (2023.01)
*G06N 3/045* (2023.01)

(56) References Cited

U.S. PATENT DOCUMENTS

| | | | |
|---|---|---|---|
| 2013/0088489 | A1 | 4/2013 | Schmeitz et al. |
| 2014/0316768 | A1 | 10/2014 | Khandekar |
| 2016/0117316 | A1 | 4/2016 | Le Quoc et al. |
| 2016/0232440 | A1 | 8/2016 | Gregor et al. |
| 2017/0140263 | A1 | 5/2017 | Kaiser et al. |
| 2017/0330586 | A1* | 11/2017 | Roblek ................ G06N 3/088 |
| 2018/0005082 | A1* | 1/2018 | Bluche ............. G06V 30/18057 |
| 2018/0075343 | A1* | 3/2018 | van den Oord ........ G06N 3/084 |
| 2019/0066713 | A1 | 2/2019 | Mesgarani |
| 2019/0102671 | A1 | 4/2019 | Cohen |

FOREIGN PATENT DOCUMENTS

| | | |
|---|---|---|
| CN | 106663092 A | 5/2017 |
| CN | 108491863 | 9/2018 |
| CN | 108664632 | 10/2018 |
| EP | 3054403 | 8/2016 |
| WO | WO2016065327 | 4/2016 |
| WO | WO2019040866 | 2/2019 |
| WO | WO2019081623 | 5/2019 |

OTHER PUBLICATIONS

Shah, et al., "Deep Residual Networks with Exponential Linear Unit," 2016 Third International Symposium on Computer Vision and the Internet (VisionNet). (Year: 2016).*

EP Office Action in European Application No. 18734997.2, dated Jan. 18, 2022, 6 pages.

Ba et al., "Layer normalization," arXiv preprint arXiv:1607.06450, Jul. 2016, 14 pages.

Bahdanau et al., "Neural Machine Translation by Jointly Learning to Align and Translate," ICLR 2015, https://arxiv.org/abs/1409.0473, last revised May 2016, 15 pages.

Cho et al., "Learning phrase representations using rnn encoder-decoder for statistical machine translation," arxiv.org/abs/1406.1078, Jun. 2014, 15 pages.

Chollet, "Xception: Deep Learning with Depthwise Separable Convolutions," https://arxiv.org/abs/1610.02357, Apr. 2017, 8 pages.

Gehring et al., "Convolutional sequence to sequence learning," International Conference on Machine Learning, aarXiv:1705.03122, Aug. 2017, 70: 1243-1252.

Hochreiter and Schmidhuber, "Long short-term memory," Neural computation, Nov. 1997, 9(8): 1735-1780.

Howard et al., "MobileNets: Efficient Convolutional Neural Networks for Mobile Vision Applications," https://arxiv.org/abs/1704.04861, Apr. 2017, 9 pages.

Kalchbrenner et al., "Neural Machine Translation in Linear Time," https://arxiv.org/abs/1610.10099, Mar. 2017, 9 pages.

Odena et al., "Deconvolution and checkerboard artifacts," Distill, Oct. 2016, retrieved Dec. 4, 2019, URL <https://distill.pub/2016/deconv-checkerboard/?utm_source=mybridge&utm_medium=blog&utm_campaign=read_more>, 1(10):e3.

PCT International Preliminary Report on Patentability in International Appln. No. PCT/US2018/033732, dated Nov. 19, 2019, 15 pages.

PCT International Search Report and Written Opinion in International Appln. No. PCT/US2018/033732, dated Aug. 24, 2018, 15 pages.

Sutskever et al., "Sequence to Sequence Learning with Neural Networks," https://arxiv.org/abs/1409.3215, last revised Dec. 2014, 9 pages.

Van den Oord et al., "Conditional image generation with pixelcnn decoders," In Advances in Neural Information Processing Systems, 2016, 4790-4798.

Van den Oord et al., "Wavenet: A generative model for raw audio," https://arxiv.org/abs/1609.03499, Sep. 2016.

Wu et al., "Google's Neural Machine Translation System: Bridging the Gap between Human and Machine Translation," https://arxiv.org/abs/1609.08144, last revised Oct. 2016.

Yu and Koltun, "Multi-scale context aggregation by dilated convolutions," arXiv:1511.07122, Nov. 2015, 13 pages.

Office Action in Chinese Appln. No. 201880028541.1, dated Dec. 5, 2022, 20 pages (with English Translation).

Office Action in Chinese Appln. No. 201880028541.1, dated Jun. 27, 2023, 11 pages (with English Translation).

* cited by examiner

DEPTHWISE SEPARABLE CONVOLUTIONS FOR NEURAL MACHINE TRANSLATION

CROSS-REFERENCE TO RELATED APPLICATIONS

This application is a continuation of U.S. patent application Ser. No. 16/688,958, filed Nov. 19, 2019, now U.S. Pat. No. 10,853,590, which is a continuation of and claims priority to PCT Application No. PCT/US2018/033732, filed on May 21, 2018, which claims priority to U.S. Provisional Application No. 62/509,038, filed on May 19, 2017. The disclosures of the prior applications are considered part of and are incorporated by reference in the disclosure of this application.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Neural networks may be trained on machine learning tasks using training data to determine trained values of the layer parameters and may be used to perform machine learning tasks on neural network inputs.

SUMMARY

This specification describes methods and systems, including computer programs encoded on computer storage media, for performing machine translation tasks. In particular, an example neural network architecture based on depth wise separable convolution operations for translating an input text segment in an input natural language to a corresponding output text segment in a target natural language is described.

In general, one innovative aspect of the subject matter described in this specification can be embodied in a method for translating an input text segment in an input natural language to a corresponding output text segment in a target natural language, the method including: receiving an input text segment in the input language; processing the input text segment using an encoder neural network to generate an encoder neural network output, the encoder neural network comprising multiple depth wise separable convolutional neural network layers; and processing the encoder neural network output using an autoregressive decoder neural network to generate a decoder neural network output, the generated decoder neural network output representing a predicted output text segment in the target natural language.

Other embodiments of this aspect include corresponding systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations processing the input text segment using an encoder neural network to generate an encoder neural network output comprises: preprocessing the input text segment using an input embedding neural network layer to generate an embedded input text segment, the input embedding neural network layer configured to receive input text segments in the input language and to embed the received input text segments into a predetermined feature depth; and processing the embedded input text segment using the encoder neural network to generate an encoder neural network output.

In some implementations each convolutional neural network layer comprises (i) a rectified linear unit non linearity component, (ii) a depth wise separable convolution component, and (iii) a neural network layer normalization component.

In some implementations the encoder neural network further comprises one or more residual connections.

In some implementations the encoder neural network comprises four depth wise separable convolutional neural network layers with two-skip connections between an input to a first depth wise separable convolutional neural network layer and outputs of a second and fourth depth wise separable convolutional neural network layer.

In some implementations the encoder neural network comprises an input encoder sub neural network and an input-output mixer sub neural network.

In some implementations the input encoder sub neural network is configured to process a received input text segment and generate as output an encoded input text segment.

In some implementations the input-output mixer neural network is configured to process (i) the encoded input text segment, and (ii) a previous decoder output to generate an encoded input-output mixer neural network output.

In some implementations the autoregressive decoder neural network is configured to receive inputs from the input encoder sub neural network and the input-output mixer neural network.

In some implementations the encoder neural network output comprises a concatenated input encoder sub neural network output and input-output mixer neural network output.

In some implementations the autoregressive decoder neural network comprises one or more convolutional neural network layers.

In some implementations the autoregressive decoder neural network and the encoder neural network comprise an attention mechanism.

In some implementations the attention mechanism comprises an inner-product attention mechanism that receives as input (i) a source tensor of shape [M, depth], and (ii) a target tensor of shape [N, depth].

In some implementations the attention mechanism is given by $$\text{Attend}(\text{source}, \text{target}) = \frac{1}{\sqrt{N}} \text{softmax}(\text{target} \cdot \text{source}^T) \cdot \text{source}.$$

In some implementations one or more of the depth wise separable convolutional neural network layers comprise super separable convolutional neural network layers, wherein a super separable convolutional neural network layer is a depth wise separable convolutional neural network layer whose final convolutional operation is factored.

In some implementations a depth wise separable convolutional neural network layer comprises a separable convolution of size $k \cdot c + c^2$, where k represents a receptive field size and c represents a number of convolution channels, and a super separable convolutional neural network layer comprises a separable convolution of size $k \cdot c + c^2/g$, where g represents a number of grouped depth dimensions.

The subject matter described in this specification can be implemented in particular embodiments so as to realize one or more of the following advantages.

The machine translation system described in this specification represents a significant technical improvement to state of the art machine translation systems. In particular, a machine translation system using depth wise separable convolutions, as described in this specification, enables machine translation tasks to be performed at similar accuracy whilst requiring less system parameters and reduced computational costs compared to conventional machine translation systems. Alternatively, a machine translation system using depth wise separable convolutions with a similar number of system parameters (compared to conventional machine translation systems) can be used to perform machine translation tasks with increased accuracy. The use of "super-separable" convolutions as described in this specification can further increase the performance of the machine translation system.

A machine translation system using depth wise separable convolutions, as described in this specification, can implement convolutional windows with increased length and therefore, unlike other machine translation systems, do not require filter dilation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a convolutional sequence-to-sequence neural network architecture for performing machine learning tasks. The neural network architecture includes stacks of depth wise separable convolutional layers with residual connections. Text segment inputs in an input natural language and text segment outputs in a target natural language are embedded into the same feature depth, encoded by two separate sub-networks and concatenated before being fed into a decoder that autoregressively generates each element of the output. At each step, the autoregressive decoder produces a new output prediction given the encoded inputs and the encoding of the existing predicted outputs. The encoders and the decoder are constructed from stacks of convolutional modules that can include depth wise separable, sub-separable or super separable convolutional layers. In some cases an attention mechanism may be used to allow the decoder to obtain information from the encoder.

Figure 1:
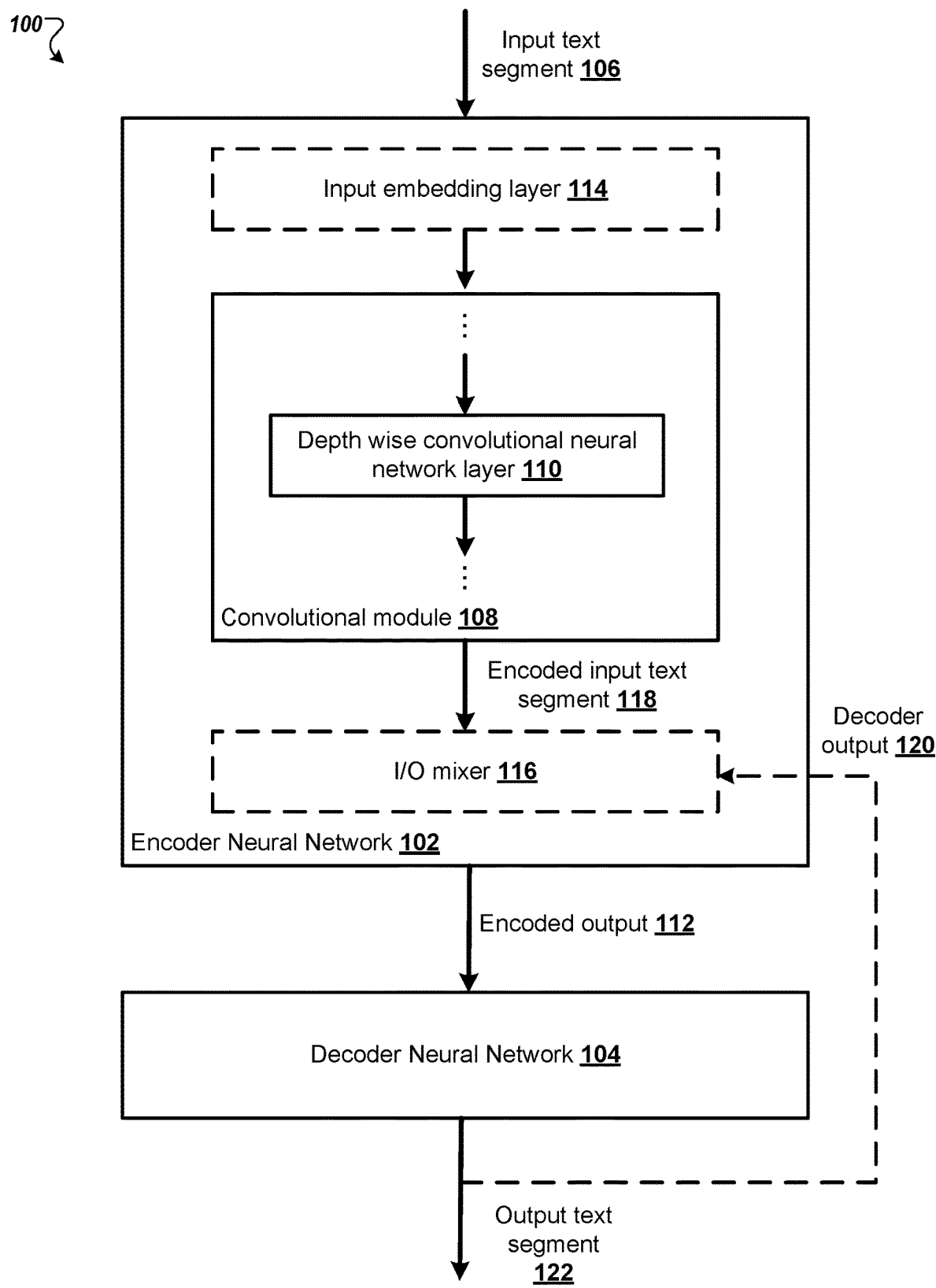
FIG. 1 is a block diagram of an example system for performing machine translation tasks.

FIG. 1 is a block diagram of an example machine translation system 100. The machine translation system 100 includes an encoder neural network 102 and a decoder neural network 104. The machine translation system 100 is an example of a system implemented as computer programs on one or more computers in one or more locations, in which the systems, components, and techniques described below, can be implemented.

The machine translation system 100 is configured to receive as input a text segment in an input natural language, e.g., input text segment 106. The machine translation system 100 processes the received input text segment using the encoder neural network 102 and the decoder neural network 104 to generate as output a predicted output text segment in a target natural language, e.g., output text segment 122. Input text segments can be received during training or when performing machine translation tasks, i.e., the input text segments may represent training examples or text to be translated. For example, the machine translation system 100 may receive input text segments from a set of training data during training, or may receive input text segments from a user device during an inferential machine translation process.

The encoder neural network 102 is configured to receive and process the input text segment 106 and to generate as output an encoder neural network output, e.g., encoded output 112. The encoder neural network 102 includes one or more convolutional modules, e.g., convolutional module 108, of multiple depth wise separable convolutional neural network layers, e.g., depth wise separable convolutional neural network layer 110. For convenience, the encoder neural network 102 is illustrated as including one convolutional module 108 with one depth wise separable convolutional neural network layer. However, the encoder neural network 102 may include more convolutional modules with multiple depth wise separable convolutional neural network layers and different types of connections between the layers. An example convolutional module as illustrated below with reference to FIG. 2.

A depth wise separable convolutional neural network layer is a neural network layer that is configured to perform depth wise separable convolutions. A depth wise separable convolution is a spatial convolution performed independently over each channel of an input, followed by a pointwise convolution, i.e., a 1×1 convolution, projecting the channels output by the depth wise convolution onto a new channel space. Depth wise separable convolutions can be described as replacing the feature learning operated by regular convolutions Conv over a joint "space-cross-channels realm" into two simpler steps, a spatial feature learning step, and a channel combination step. For example, a depth wise separable convolution operation may be defined as $$\text{SepConv}(W_p, W_d, y)_{(i,j)} = \text{Pointwise Conv}_{(i,j)}(W_p, \text{DepthwiseConv}_{(i,j)}(W_d, y))$$

with Pointwise $\text{Conv}(W,y)_{(i,j)} = \sum_m^M W_m \cdot y_{(i,j,m)}$ and Depthwise$\text{Conv}_{(i,j)}(W,y) = \sum_{k,l}^{K,L} W_{(k,l)} \odot y_{(i+k,j+l)}$ where $\odot$ represents element wise product (note that a standard convolution operation may be defined as $Conv_{(i,j)}(W,y)=\Sigma_{k,l,m}^{K,L,M} W_{(k,l,m)} \cdot y_{(i+k,j+l,m)}$.)

In some implementations one or more of the depth wise separable convolutional neural network layers included in the convolutional module 108 may include super separable convolutional neural network layers. A super separable convolutional neural network layer is a depth wise separable convolutional neural network layer with increased separation achieved by separating an input tensor into multiple groups and applying separable convolutional operations to each separated group.

More specifically, a super separable convolutional operation SuperSC with group g is an operation that can be applied to a tensor x. The operation includes splitting x on the depth dimension into g groups, applying a separable convolution SepConv to each group separately, and concatenating results on the depth dimension $Concat_{depth}$, i.e., $$Super\ SC_g(\overline{W_p},\overline{W_d},x)=Concat_{depth}(SepConv(W_p^1, W_d^1,x^1),\ldots,SepConv(W_p^g,W_d^g,x^g)) \quad (1),$$

where $x^1,\ldots,x^g$ represents x split on the depth axis and $W_p^i$, $W_d^i$ for $i=1,\ldots,g$ represent the parameters of each separable convolution. Since each $W_d^i$ is of size $k \cdot c/g$ and each $W_p^i$ is of size $c^2/g^2$, the size of a super separable convolutional operation is $k \cdot c + c^2/g$ (whereas a separable convolution operation has size $k \cdot c + c^2$.) Since a super-separable convolution does not allow channels in separate groups to exchange information, in some implementations super separable convolution operations may be stacked in layer with co-prime g, e.g., alternating between g=2 and g=3.

In some cases, the multiple depth wise separable convolutional neural network layers may include (i) a rectified linear unit (ReLU) non linearity component that acts on the inputs to the neural network layer, (ii) a depth wise separable convolution component SepConv, and (iii) a neural network layer normalization component that acts over the h hidden units of a neural network layer below. For example, convolutional operations performed by a depth wise separable convolutional neural network layer may be defined as $$ConvStep_{d,s}(W,x)=LN(SepConv_{d,s}(W,ReLU(x))) \quad (2)$$

where d, s represent stride and dilation factor, W represents convolutional neural network layer weights, x represents an input tensor, and LN represents layer normalization given by $$LN(x) = \frac{G}{\sigma(x)}(x - \mu(x)) + B \text{ with } G,$$

B scalar learned parameters that scale and shift the normalized units and $$\sigma(x) = \sqrt{\frac{1}{h}\Sigma_i^h (x_i = \mu(x))^2} \text{ with } \mu(x) = \frac{1}{h}\Sigma_i^h x_i,$$

where the sums are taken over the last depth dimension of x. An example convolutional module of stacked depth wise separable convolutional neural network layers is described below with reference to FIG. 2.

The convolutional module 108 of multiple depth wise separable convolutional neural network layers receives and processes the input text segment 106 (or, alternatively, an embedded input text segment as described below) to generate an encoded input text segment (or an encoded embedded input text segment), e.g., encoded input text segment 118.

Optionally, the encoder neural network 102 may further include an input embedding neural network layer 114. The input embedding neural network layer 114 is a neural network layer that is configured to receive input text segments in the input language, e.g., input text segment 106, and to generate an embedded input text segment, e.g., with one embedding for each word, for each character, or for each sub-word unit. The embedded input text segment may include a predetermined feature depth. In some implementations the embeddings performed by the input embedding neural network layer may be learned or pre-determined.

The embedded input text segment may then be provided to the convolutional module 108 as input.

Optionally, the encoder neural network 102 may further include an input/output mixer neural network 116. The input-output mixer neural network 116 is a neural network that is configured to process encoded input text segments (or encoded embedded input text segments), e.g., encoded input text segment 118, and previous decoder neural network 104 outputs, e.g., decoder output 120, to generate respective encoded input-output mixer neural network outputs. The encoder neural network 102 may be included because the model is auto-regressive—the model produces the next word of output based on all previously output words—therefore the previous output (e.g., a partially translated sentence) can be mixed with the input sentence in the original language by the input/output mixer neural network.

In some implementations the input-output mixer neural network 116 may include an attention mechanism, e.g., an inner product attention that receives as input (i) a source tensor of shape [M, depth], and (ii) a target tensor of shape [N, depth]. The attention mechanism computes feature vector similarities at each position and re-scales according to depth, and may be given by $$Attend(source, target) = \frac{1}{\sqrt{N}} softmax(target \cdot source^T) \cdot source.$$

An example input/output mixer neural network is illustrated and described below with reference to FIG. 4.

Outputs from the encoder neural network 102, e.g., encoded output 112 are provided to the decoder neural network 104.

The decoder neural network 104 is an autoregressive neural network that is configured to receive and process the encoded output 112 and to generate as output a decoder neural network output representing a predicted output text segment in the target natural language, e.g., output text segment 122. In cases where the encoder neural network 102 includes an input/output mixer neural network 116, the decoder neural network 104 may be configured to receive and process an output from the convolutional module 108 concatenated with an output from the input-output mixer neural network 116.

The decoder neural network 104 may include multiple convolutional neural network layers. In some cases the decoder neural network 104 may include an attention mechanism. In some cases the attention mechanism may be similar to the attention mechanism used by the input output mixer neural network 116 and include an inner-product attention mechanism that receives as input (i) a source tensor of shape [M, depth], and (ii) a target tensor of shape [N, depth]. For example, the attention mechanism may be given by $$\text{Attend}(\text{source}, \text{target}) = \frac{1}{\sqrt{N}} \text{softmax}(\text{target} \cdot \text{source}^T) \cdot \text{source}.$$

source. An example decoder neural network is illustrated and described below with reference to FIG. 5.

The machine translation system 100 can be trained to perform machine translation tasks using training data. For example, training data may include training text segments in an input natural language and corresponding text segments in a target natural language. For example, the training data may include multiple training examples, each training example including (i) a text segment in the input natural language, and (ii) a corresponding text segment in the target natural language that represents a translation of the text segment in the input natural language. The training data may be used to adjust the encoder neural network 102 and decoder neural network 104 weights from initial values to trained values, e.g., by processing the training examples using the machine translation system and adjusting the encoder neural network 102 and decoder neural network 104 weights to minimize a corresponding loss function using gradient descent and backpropagation.

Once the machine translation system 100 has been trained, the machine translation system 100 can be used to perform inferential machine translation tasks. For example, a user device may send data (i) representing an input text segment in an input natural language, and (ii) indicating a target language to the machine translation system 100 over a network. The machine translation system 100 may process the received data and provide data representing a translation of the input text segment in the target natural language to the user device. The translation can then be displayed, added to a document, submitted to an application, or otherwise used by the user device.

Figure 2:
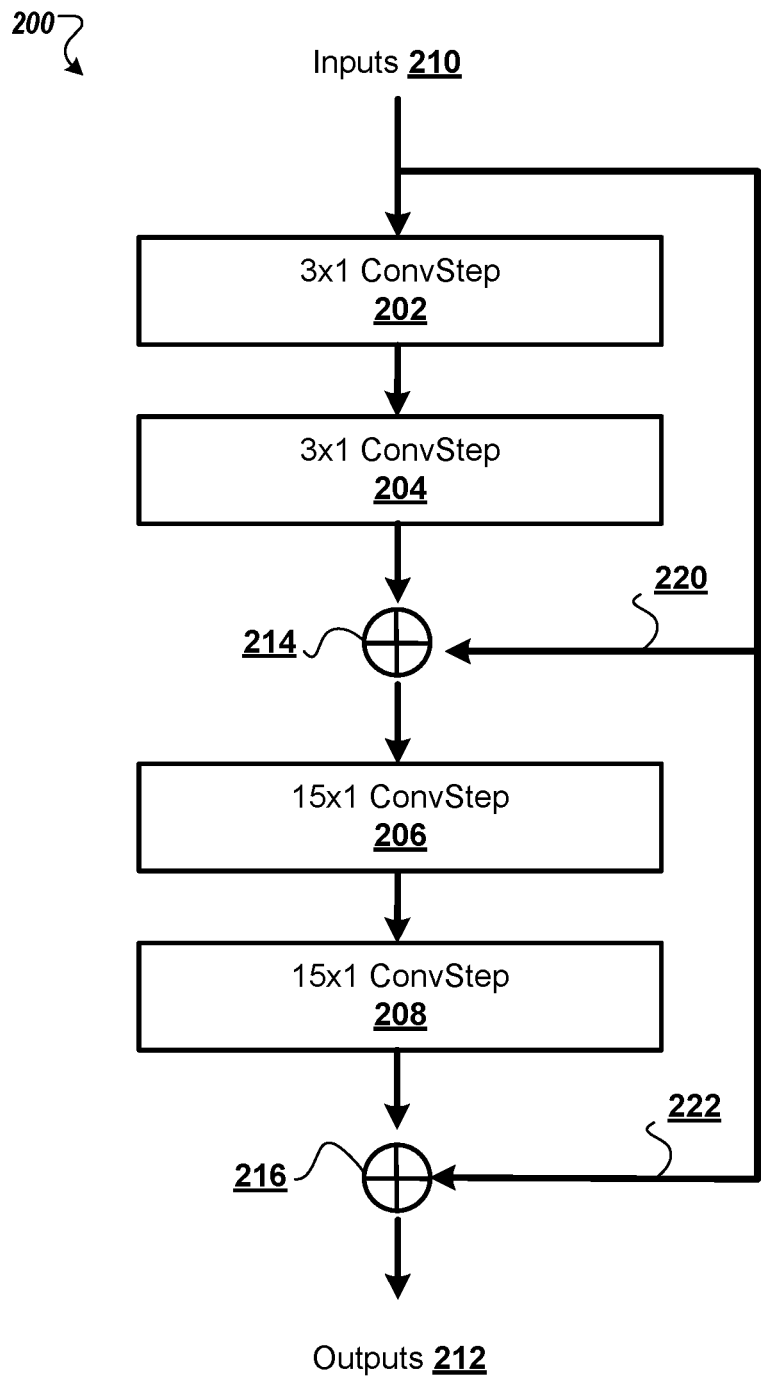
FIG. 2 is a block diagram of an example convolutional module.

FIG. 2 is a block diagram of an example convolutional module 200, as introduced above with reference to FIG. 1. The example convolutional module 200 is an example of a system implemented as computer programs on one or more computers in one or more locations, in which the systems, components, and techniques described below, can be implemented.

The example convolutional module 200 includes a stack of four depth wise separable convolutional neural network layers 202-208 that each perform the convolutional operation ConvStep defined above with reference to FIG. 1. The stack of depth wise separable convolutional neural network layers includes two skip-connections 220, 222 between the stack input 210 and the outputs of (i) the second convolutional step 204 and (ii) the fourth convolutional step 208. The stack of depth wise separable convolutional neural network layers also includes two residual connections 214 and 216. The operations performed by each of the four depth wise separable convolutional neural network layers 202-208 and the convolutional module 200 as a whole can be described as $$\text{hidden1}(x) = \text{ConvStep}_{1,1}(W_{h1}^{3\times 1}, x) \quad (3)$$

$$\text{hidden2}(x) = x + \text{ConvStep}_{1,1}(W_{h2}^{3\times 1}, \text{hidden1}(x))$$

$$\text{hidden3}(x) = \text{ConvStep}_{1,1}(W_{h3}^{15\times 1}, \text{hidden2}(x))$$

$$\text{hidden4}(x) = x + \text{ConvStep}_{8,1}(W_{h4}^{15\times 1}, \text{hidden3}(x))$$

$$\text{ConvModule}(x) = \begin{cases} \text{Dropout}(\text{hidden4}(x), 0.5) & \text{during training} \\ \text{hidden4}(x) & \text{otherwise} \end{cases}$$

where $W_p^i$ represents the parameters of each separable convolution and ConvStep is defined in Equation (2) above. When the machine translation system 100 is trained a 50% dropout Dropout(hidden4(x), 0.5) is added to the end of the convolutional module 200, however after training, i.e., during inference, the output of the convolutional module 200 is equal to the output of the last convolutional neural network layer, e.g., hidden4(x).

Figure 3:
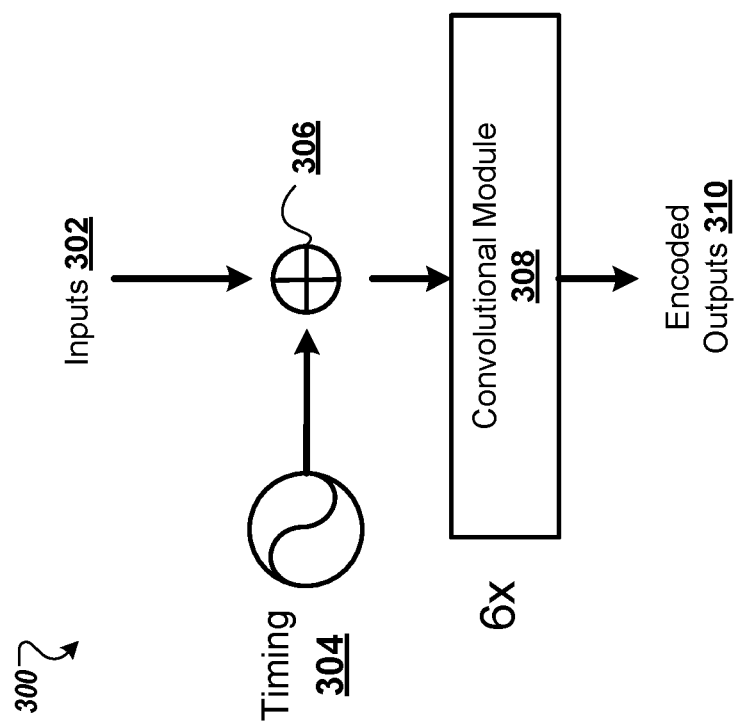
FIG. 3 is a block diagram of an example input encoder neural network.

FIG. 3 is a block diagram of an example input encoder neural network 300, as introduced above with reference to FIG. 1. The example input encoder neural network 300 is an example of a system implemented as computer programs on one or more computers in one or more location's, in which the systems, components, and techniques described below, can be implemented.

The example input encoder neural network 300 includes a residual connection 306 between the (optionally embedded) input text segment 302 and a timing signal 304. The timing signal 304 is a tensor of any shape [k, depth] defined by concatenating sine and cosine functions of different frequencies calculated up to k:

$$\text{timing}(t, 2d) = \sin(t/10000^{2d/depth}) \quad (4)$$

$$\text{timing}(t, 2d+1) = \cos\left(t/10000^{\frac{2d}{depth}}\right)$$

The timing signal 304 allows an attention mechanism included in the decoder neural network described above and below with reference to FIGS. 1 and 5 to access positional information from the input encoder neural network 300. For example, a full attention mechanism included in the decoder neural network may include adding the timing signal to the targets, performing two convolutional steps and attending to the source, e.g., attention1(x)=ConvStep$_{1,1}$($W_{a1}^{5\times 1}$, x+timing)

attention(source,target)=Attend(source,ConvStep$_{4,1}$
  ($W_{a1}^{5\times 1}$,attention1(target))). (5)

where ConvStep is defined in Equation (2) above, $W_{a1}^{5\times 1}$ is defined in Equation (3) above, and timing is defined in Equation (4) above.

After the timing signal 304 has been added to the input 302, the combined input is provided to the convolutional module 308 for processing. The convolutional module 308 includes multiple depth wise separable convolutional neural network layers, as described above with reference to FIGS. 1 and 2. The convolutional module 308 generates as output an encoded input text segment, e.g., encoded output 310. The action of the example input encoder neural network 300 can be summarized as InputEncoder(x)=ConvModule(x+timing). (6)

where ConvModule is defined in Equation (3) above and timing is defined in Equation (4) above.

Figure 4:
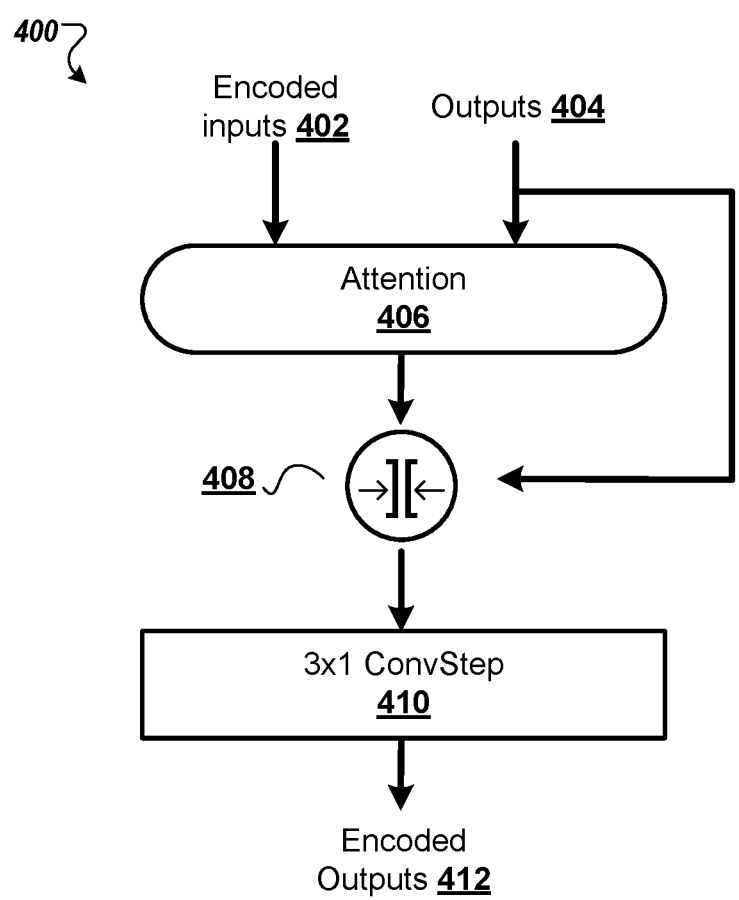
FIG. 4 is a block diagram of an example input/output mixer neural network.

FIG. 4 is a block diagram of an example input/output mixer neural network 400, as introduced above with reference to FIG. 1. The example input/output mixer neural network 400 is an example of a system implemented as computer programs on one or more computers in one or more locations, in which the systems, components, and techniques described below, can be implemented.

The example input/output mixer neural network 400 includes an attention mechanism 406 that receives encoded inputs 402 from the encoder neural network described above with reference to FIGS. 1 and 3, and receives outputs 404 generated by the decoder neural network described above and below with reference to FIGS. 1 and 5. The input/output mixer neural network 400 concatenates 408 the output of the attention mechanism 406 and the outputs 404 along the $2^{nd}$ dimension. The concatenated outputs are then processed using a convolutional module 410 of multiple depth wise separable convolutional neural network layers, as described above with reference to FIGS. 1 and 2. The convolutional module 410 generates as output an encoded mixed output, e.g., encoded output 412. The action of the example input/output mixer neural network 400 can be summarized as $$\text{IOMixer}(i,o) = \text{ConvStep}_{1,1}(W^{3\times 1}, [\text{attention}(i,o)\|_2 o]) \quad (7)$$

where $[a\|_d b]$ represents a concatenation of tensors a and b along the d-th dimension, ConvStep is defined in Equation (2) above and attention is defined in Equation (5) above.

Figure 5:
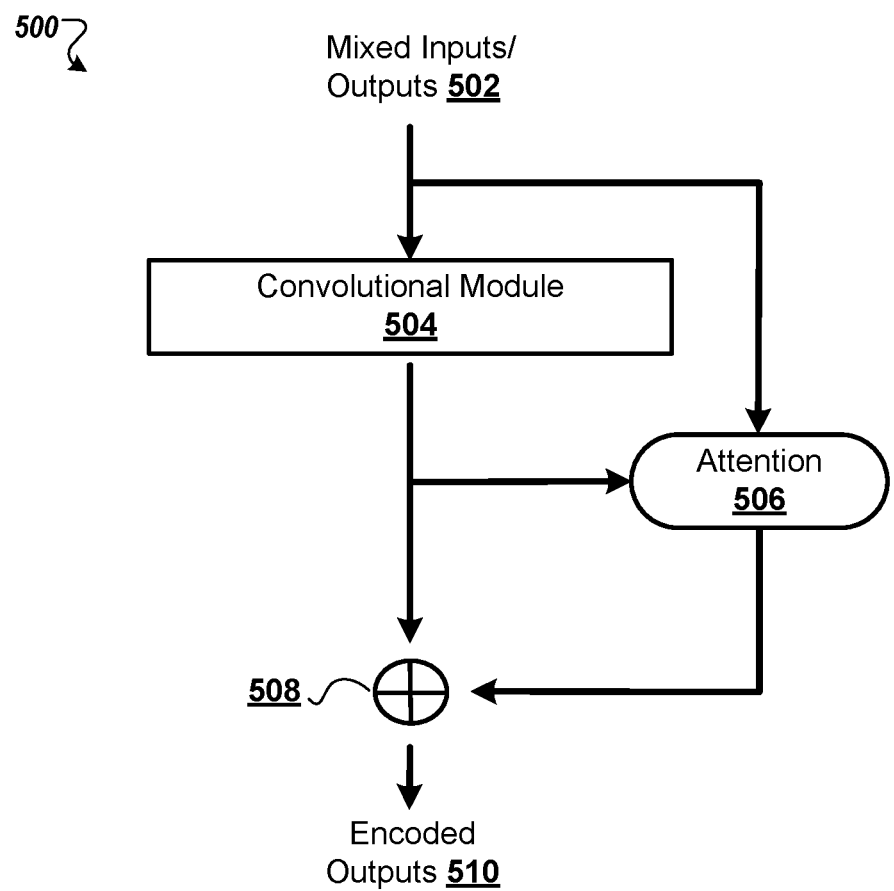
FIG. 5 is a block diagram of an example decoder neural network.

FIG. 5 is a block diagram of an example decoder neural network 500, as introduced above with reference to FIG. 1. The example decoder neural network 500 is an example of a system implemented as computer programs on one or more computers in one or more locations, in which the systems, components, and techniques described below, can be implemented.

The example decoder neural network 500 includes a convolutional module 504 of multiple depth wise separable convolutional neural network layers, attention mechanism 506, and a residual connection 508. The convolutional module 504 is configured to receive mixed inputs/outputs 502 from the input/output mixer neural network 400 described above with reference to FIG. 4, and to process the received mixed inputs/outputs 502 to generate a convolutional output that is provided to the attention mechanism 506 and to the residual connection 508. The attention mechanism 506 is configured to receive and process the mixed inputs/outputs 502 and the convolutional output from the convolutional module 504, and generate an output that is provided to the residual connection 508. The residual connection adds the two outputs to generate an encoded output 510. The action of the example decoder neural network 500 can be summarized as $$\text{AttnConvModule}(x, \text{source}) = \text{ConvModule}(x) + \text{attention}(\text{source}, x)$$

$$\text{Decoder}(x) = \text{AttnConvModule}(x, \text{InputEncoder}(\text{inputs})). \quad (8)$$

where ConvModule is defined in Equation (3) above and attention is defined in Equation (5) above.

Figure 6:
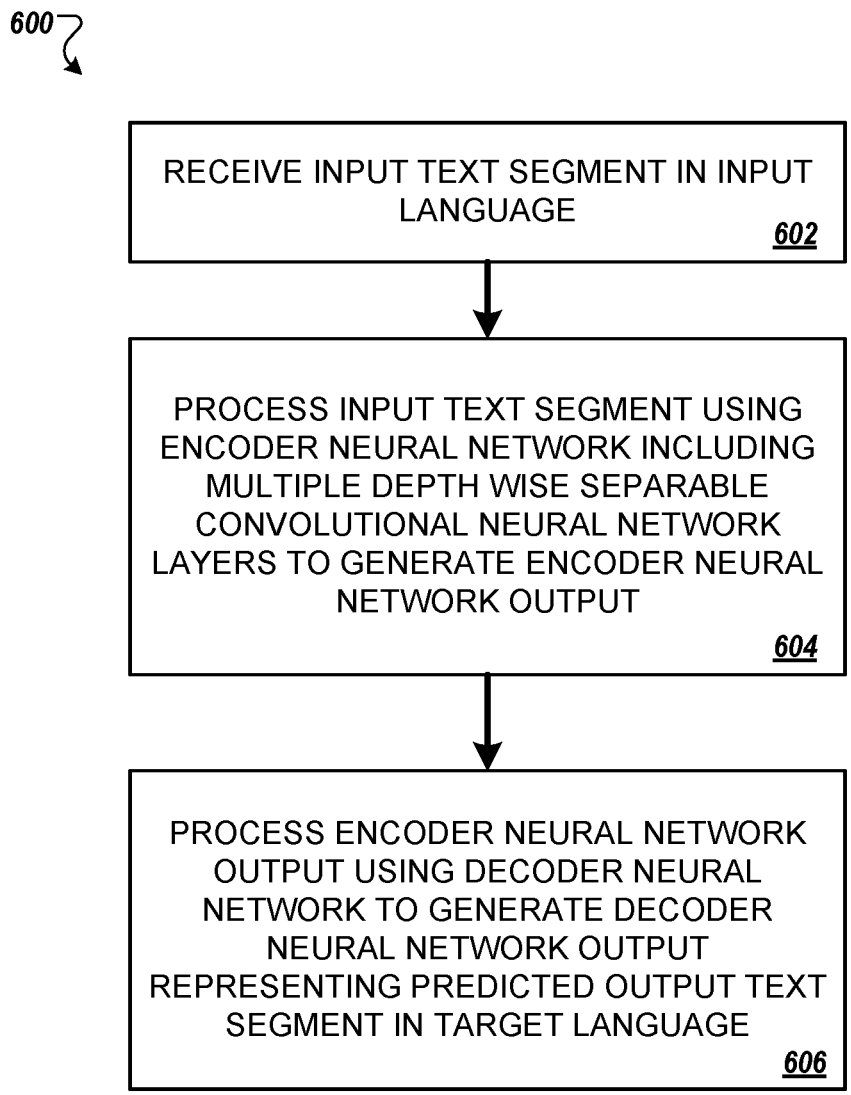
FIG. 6 is a flow diagram of an example process for translating an input text segment in an input natural language to a corresponding output text segment in a target natural language.

FIG. 6 is a flow diagram of an example process 600 for translating an input text segment in an input natural language to a corresponding output text segment in a target natural language. For convenience, the process 600 will be described as being performed by a system of one or more computers located in one or more locations. For example, a machine translation system, e.g., the machine translation system 100 of FIG. 1, can perform the process 600.

The system receives an input text segment in the input language (step 602). For example, the input text segment may be a sentence in a particular natural language.

Optionally, the system may preprocess the received input text segment using an input embedding neural network layer. The input embedding neural network layer is a neural network layer that is configured to receive input text segments in the input language and to embed the received input text segments into a predetermined feature depth, as described above with reference to FIG. 1.

The system processes the input text segment, or the embedded input text segment, using an encoder neural network that includes multiple depth wise separable convolutional neural network layers to generate an encoder neural network output (step 604). In some implementations one or more of the depth wise separable convolutional neural network layers may include super separable convolutional neural network layers—a depth wise separable convolutional neural network layer whose final convolutional operation is factored. Super separable convolutional neural network layers are described in detail above with reference to FIG. 1.

In some implementations the encoder neural network may include an attention mechanism, e.g., an inner-product attention mechanism that receives as input (i) a source tensor of shape [M, depth], and (ii) a target tensor of shape [N, depth], or an attention mechanism given by $$\text{Attend}(\text{source}, \text{target}) = \frac{1}{\sqrt{N}} \text{softmax}(\text{target} \cdot \text{source}^T) \cdot \text{source},$$

source.

In some implementations the encoder neural network may further include an input/output mixer neural network. In these implementations processing the input text segment or embedded input text segment includes processing the input through the multiple depth wise separable convolutional neural network layers to generate an encoded input text segment or an encoded embedded input text segment, and processing the encoded input text segment together with a previous decoder output using the input/output mixer neural network to generate an encoded input-output mixer neural network output.

For example, the system may process the input text segment using the encoder neural network 102 described above with reference to FIG. 1.

The system processes the encoder neural network output using an autoregressive decoder neural network to generate a predicted output text segment in the target natural language (step 606). In some implementations the autoregressive decoder neural network may include one or more convolutional neural network layers, e.g., depth wise separable convolutional neural network layers such as super separable convolutional neural network layers, and/or an attention mechanism (as described above with reference to step 604.)

In cases where the encoder neural network includes an input/output mixer neural network, the system may process an encoded input text segment or encoded embedded input text segment and the input-output mixer neural network output, e.g., as a concatenated input, to generate the predicted output text segment in the target natural language.

For example, the system may process the encoder neural network output using the decoder neural networks 104 and 500 described above with reference to FIGS. 1 and 5.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g. an HTML page, to a user device, e.g. for purposes of displaying data to and receiving user input from a user interacting with the user device, which acts as a client. Data generated at the user device, e.g. as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for processing an input text segment in an input natural language to generate a final output for the input text segment, the method comprising:
receiving an input text segment in the input language;
processing the input text segment using an encoder neural network to generate an encoder neural network output, the encoder neural network comprising multiple depth wise separable convolutional neural network layers and one or more residual connections between the multiple depth wise separable convolutional neural network layers; and
processing the encoder neural network output using a decoder neural network to generate a decoder neural network output, the generated decoder neural network output representing the final output,
wherein at least one of the multiple depthwise separable convolutional neural network layers comprises (i) a depthwise separable convolution component and (ii) a neural network layer normalization component.

2. The method of claim 1, wherein the final output for the input text segment is an output text segment in a target natural language that is a predicted translation of the input text segment into the target natural language.

3. The method of claim 1, wherein processing the input text segment using an encoder neural network to generate an encoder neural network output comprises:
preprocessing the input text segment using an input embedding neural network layer to generate an embedded input text segment, the input embedding neural network layer configured to receive input text segments in the input language and to embed the received input text segments into a predetermined feature depth; and
processing the embedded input text segment using the encoder neural network to generate an encoder neural network output.

4. The method of claim 1, wherein the at least one of the multiple depthwise separable convolutional neural network layers further comprises a rectified linear unit (RELU) component.

5. The method of claim 1, wherein the encoder neural network comprises four depth wise separable convolutional neural network layers with two-skip connections between an input to a first depth wise separable convolutional neural network layer and outputs of a second and fourth depth wise separable convolutional neural network layer.

6. The method of claim 1, wherein the encoder neural network comprises an input encoder sub neural network and an input-output mixer sub neural network.

7. The method of claim 6, wherein the input encoder sub neural network is configured to process a received input text segment and generate as output an encoded input text segment.

8. The method of claim 7, wherein the input-output mixer neural network is configured to process (i) the encoded input text segment, and (ii) a previous decoder output to generate an encoded input-output mixer neural network output.

9. The method of claim 8, wherein the decoder neural network is configured to receive inputs from the input encoder sub neural network and the input-output mixer neural network.

10. The method of claim 9, wherein the encoder neural network output comprises a concatenated input encoder sub neural network output and input-output mixer neural network output.

11. The method of claim 1, wherein the decoder neural network comprises one or more convolutional neural network layers.

12. The method of claim 1, wherein the decoder neural network and the encoder neural network comprise an attention mechanism.

13. The method of claim 1, wherein one or more of the depth wise separable convolutional neural network layers comprise super separable convolutional neural network layers, wherein a super separable convolutional neural network layer is a depth wise separable convolutional neural network layer whose final convolutional operation is factored.

14. The method of claim 13, wherein a depth wise separable convolutional neural network layer comprises a separable convolution of size $k \cdot c + c^2$, where k represents a receptive field size and c represents a number of convolution channels, and wherein a super separable convolutional neural network layer comprises a separable convolution of size $k \cdot c + c^2/g$, where g represents a number of grouped depth dimensions.

15. A computer implemented system for processing an input text segment in an input natural language to generate a final output for the input text segment, the system comprising:
one or more computers and one or more storage devices storing instructions that, when executed by the one or more computers, cause the one or more computers to perform:
receiving an input text segment in the input language;
processing the input text segment using an encoder neural network to generate an encoder neural network output, the encoder neural network comprising multiple depth wise separable convolutional neural network layers and one or more residual connections between the multiple depth wise separable convolutional neural network layers; and
processing the encoder neural network output using a decoder neural network to generate a decoder neural network output, the generated decoder neural network output representing the final output,
wherein at least one of the multiple depthwise separable convolutional neural network layers comprises (i) a depthwise separable convolution component and (ii) a neural network layer normalization component.

16. The system of claim 15, wherein the final output for the input text segment is an output text segment in a target natural language that is a predicted translation of the input text segment into the target natural language.

17. The system of claim 15, wherein processing the input text segment using an encoder neural network to generate an encoder neural network output comprises:
preprocessing the input text segment using an input embedding neural network layer to generate an embedded input text segment, the input embedding neural network layer configured to receive input text segments in the input language and to embed the received input text segments into a predetermined feature depth; and
processing the embedded input text segment using the encoder neural network to generate an encoder neural network output.

18. One or more non-transitory computer-readable storage media encoded with instructions that, when executed by one or more computers, cause the one or more computers to perform operations to process an input text segment in an input natural language to generate a final output for the input text segment, operations comprising:
receiving an input text segment in the input language;
processing the input text segment using an encoder neural network to generate an encoder neural network output, the encoder neural network comprising multiple depth wise separable convolutional neural network layers and one or more residual connections between the multiple depth wise separable convolutional neural network layers; and
processing the encoder neural network output using a decoder neural network to generate a decoder neural network output, the generated decoder neural network output representing the final output,
wherein at least one of the multiple depthwise separable convolutional neural network layers comprises (i) a depthwise separable convolution component and (ii) a neural network layer normalization component.

19. The one or more non-transitory computer-readable storage media of claim 18, wherein the final output for the input text segment is an output text segment in a target natural language that is a predicted translation of the input text segment into the target natural language.

* * * * *